United States Patent [19]
Inoue et al.

[11] Patent Number: 4,735,971
[45] Date of Patent: Apr. 5, 1988

[54] ROOM TEMPERATURE-CURABLE ORGANOPOLYSILOXANE COMPOSITION

[75] Inventors: Yoshio Inoue; Masatoshi Arai; Shinichi Sato, all of Gunma, Japan

[73] Assignee: Shin-Etsu Chemical Co., Ltd., Tokyo, Japan

[21] Appl. No.: 12,021

[22] Filed: Feb. 9, 1987

[30] Foreign Application Priority Data

Feb. 25, 1986 [JP] Japan .................................. 61-39456

[51] Int. Cl.$^4$ .............................................. C08L 1/00
[52] U.S. Cl. ...................................... 522/42; 522/33; 522/44; 522/46; 522/99; 522/148; 522/172; 528/30; 528/32
[58] Field of Search ................... 528/30, 32, 901; 522/99, 148, 172, 46, 44, 42, 33

[56] References Cited

U.S. PATENT DOCUMENTS 4,558,147 12/1985 Eckberg et al. .................... 522/99
4,579,636 4/1986 Inoue et al. ........................ 528/17
4,617,238 10/1986 Crivello ............................. 528/32

Primary Examiner—Melvyn I. Marquis
Attorney, Agent, or Firm—Wyatt, Gerber, Shoup, Scobey and Badie

[57] ABSTRACT

The inventive organopolysiloxane composition is curable in two ways, firstly, by the irradiation with ultraviolet light and, secondly, by exposure to a moisture-containing atmospheric air. The principal ingredient of the composition is a diorganopolysiloxane having, in a molecule, at least one isopropenyloxysilyl-substituted ethyl or propyl group bonded to the silicon atom of the polysiloxane chain, which is compounded with a mercaptoalkyl-containing organopolysiloxane, a photosensitizer and, optionally, a curing catalyst for the dealcoholation condensation reaction of the silicon-bonded alkoxy groups under the influence of atmospheric moisture. The composition is advantageous in the improved workability by virtue of the adequate tack-free time or the time taken for surface filming.

5 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to an organopolysiloxane composition having two-way curability at room temperature by irradiation with ultraviolet light and under the influence of atmospheric moisture and useful as an adhesive, sealing material and so on.

Various types of room temperature-curable organopolysiloxane compositions capable of giving a rubbery elastomer by curing are known in the prior art. They are classified into two classes depending on the type of the procedure to cause crosslink formation between the organopolysiloxane molecules. The first class of the compositions includes those stable and storable under a hermetically sealed moisture-free condition but curable by the reaction with the atmospheric moisture. The second class of the compositions includes those stable and storable in dark but curable when irradiated with actinic rays or, in particular, with ultraviolet light.

These two classes of the curable organopolysiloxane compositions have their respective problems and disadvantages. A problem in the moisture-curable compositions, for example, is the relatively low curing velocity as a natural consequence of the crosslinking mechanism that the velocity of curing is under a rate-determining factor of the diffusion of the atmospheric moisture penetrating the surface into the core portion of a body of the composition. Such a slow-curing composition is of course not suitable when rapid curing within, for example, a few seconds is desirable or essential and cannot be used as an adhesive or sealing material of which the effects of adhesive bonding or sealing should desirably be exhibited within a short time. The ultraviolet-curable organopolysiloxane compositions, on the other hand, have a disadvantage that, although very rapid curing can be achieved in the portions under direct irradiation with ultraviolet, no complete curing can be obtained excepting the very surface layer when the composition is colored by formulating a pigment or, if not colored, in a shaded portion not under direct ultraviolet irradiation. In particular, thick bodies of the composition can never be fully cured to the core portion where the ultraviolet light cannot reach even though the surface layer has been satisfactorily cured.

An organopolysiloxane composition improved relative to the above mentioned problems has been proposed and disclosed in Japanese Patent Kokai No. 60-231761. The composition proposed there comprises, as the curing agent added to the diorganopolysiloxane terminated at each of the molecular chain ends with a silanolic hydroxy group as the principal ingredient, (1) a combination of a vinyl silane compound having a vinyl group and a hydrolyzable group in the same molecule or a partial hydrolysis product thereof and (2) a mercapto group-containing organopolysiloxane having, in a molecule, at least two mercapto groups. The composition of this type is curable by the ultraviolet-induced addition reaction between the vinyl groups and the mercapto groups when under ultraviolet irradiation while the curing reaction in the portion not reached by the ultraviolet light can proceed by the mechanism of the condensation reaction between the silanol groups of the diorganopolysiloxane and the hydrolyzable groups of the silane compound. The curing behavior of the composition of this type, however, is not quite satisfactory, presumably, due to the relatively small number of the vinyl groups introduced into the composition. This problem of poor curability could be solved by replacing a part of the monovalent hydrocarbon groups in the diorganopolysiloxane with vinyl groups so as to substantially increase the overall number of the vinyl groups in the composition if it were not for the sacrifice in the elongation of the cured composition with an unduly increased hardness.

Accordingly, the inventors have further continued extensive investigations on the organopolysiloxane compositions curable in two ways of the ultraviolet-induced photochemical addition reaction and the condensation reaction in the presence of the atmospheric moisture. A proposal was made on the base of the discovery obtained in the investigations but the composition thus developed was not practicable due to the unduly short tack-free time of only a few minutes or shorter or unduly rapid surface filming to cause inconvenience in the application of the composition.

SUMMARY OF THE INVENTION

Thus, the present invention, completed as a result of the above mentioned investigations, provides a novel and improved room temperature-curable organopolysiloxane which comprises: (A) 100 parts by weight of an organopolysiloxane having, in a molecule, at least one isopropenyloxy silyl-substituted ethyl or propyl group represented by the general formula

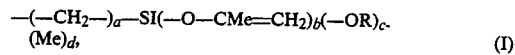
(I)

in which Me denotes a methyl group, R denotes a monovalent saturated hydrocarbon group, a is 2 or 3, b is 1, 2 or 3 and c and d are each zero, 1 or 2 with the proviso that $b+c+d$ is equal to 3;

(B) a mercapto-containing organopolysiloxane having, in a molecule, at least two mercapto groups in such an amount as to provide from 0.1 to 20 moles of the mercapto groups per mole of the isopropenyloxy groups in the component (A);

(C) from 0.01 to 10 parts by weight of a photosensitizer; and (D) up to 10 parts by weight of a curing catalyst.

DETAILED DESCRIPTION OF THE PREFERRED EMBODIMENTS

As is understood from the above given summary of the invention, the inventive composition comprises, essentially, the components (A), (B) and (C) and, optionally, the component (D), of which the most characteristic ingredient is the component (A) having, in a molecule, at least one isopropenyloxy silyl-substituted ethyl or propyl group of the formula (I). When the organopolysiloxane having such a group is reacted with the mercapto groups in the component (B), the tack-free time or the time taken for surface filming is adequately extended because the isopropenyloxy groups in the component (A) is bonded to the silicon atoms in the polysiloxane structure but bonded indirectly through an alkylene group of $-(-CH_2-)_2-$ or $-(-CH_2-)_3-$ forming a silalkylene linkage while the reactivity of the isopropenyloxy groups in the component (A) with the mercapto groups in the component (B) is not affected.

The component (A) as one of the essential ingredients in the inventive composition is an organopolysiloxane having, in a molecule, at least one isopropenyloxy silyl-substituted alkyl group of the general formula (I) bonded to the silicon atom in the polysiloxane structure. In the formula, the symbol R denotes a monovalent hydrocarbon group having from 1 to 8 carbon atoms and free from aliphatic unsaturation exemplified by alkyl groups, e.g. methyl, ethyl, propyl and butyl groups, aryl groups, e.g. phenyl and tolyl groups and cycloalkyl groups, e.g. cyclohexyl group, as well as those substituted groups obtained by replacing a part or all of the hydrogen atoms in the above named hydrocarbon groups with halogen atoms, cyano groups and other substituent atoms or groups. The subscript a is 2 or 3 so that the group of the formula (I) is a substituted ethyl or propyl group. The subscript b is 1,2 or 3 so that the group of the formula (I) should have at least one isopropenyloxy group bonded to the silicon atom. When b is 1, however, the organopolysloxane should have at least two of the groups represented by the formula (I) or, when the molecules of the organopolysiloxane each have only one of the group represented by the formula (I), the value of b should be at least 1.05 on an average for the groups. The subscripts c and d are each zero, 1 or 2 with the proviso that b+c+d is equal to 3 to satisfy the tetravalency of the silicon atom.

Several of the particular examples of the organopolysiloxane suitable as the component (A) include those expressed by the following structural and unit formulas, in which the symbols Me, Ph and Ipo denote methyl, phenyl and isopropenyloxy groups, respectively, and the subscripts m and n are each zero or a positive integer and l is a positive integer of 2 or larger:

Ipo$_2$MeSi—CH$_2$CH$_2$—(SiMe$_2$—O)$_n$—SiMe$_2$—CH$_2$CH$_2$—SiMeIpo$_2$;

Me$_3$Si—O—(SiMe$_2$—O)$_n$—[SiMe——————O—————]$_m$ SiMe$_3$;
　　　　　　　　　　　　　　|
　　　　　　　　　　　CH$_2$CH$_2$Si(OMe)Ipo$_2$

IpoMe$_2$Si—CH$_2$CH$_2$—SiMe$_2$—(O—SiMe$_2$)$_n$—(O—SiPh$_2$)$_m$—(O—SiMePh)$_l$—CH$_2$CH$_2$—SiMe$_2$Ipo; and (Ipo$_3$Si—CH$_2$CH$_2$)$_l$(MeSiO$_{1.5}$)$_m$(Me$_3$SiO$_{0.5}$)$_n$.

The above described organopolysiloxanes suitable as the component (A) can be synthesized by the hydrosilation reaction between an organopolysiloxane having one or more of vinyl or allyl groups bonded to the silicon atoms and an isopropenyloxy-containing organosilane compound having a hydrogen atom directly bonded to the silicon atom as represented by the general formula HSiIpo$_p$(OR)$_c$Me$_d$, in which each of the symbols has the same meaning as defined before, in the presence of a platinum compound as a catalyst to promote the addition reaction with heating. The above mentioned organopolysiloxane having vinyl or allyl groups is exemplified by a dimethyl polysiloxane terminated at each molecular chain end with a vinyl dimethyl silyl group and a trimethylsilyl-terminated dimethylpolysiloxane substituted by vinyl or allyl groups for a part of the methyl groups at the intermediate positions between the terminals. Examples of the above mentioned isopropenyloxy-containing organosilane compound include those expressed by the following structural formulas, in which Bu is a butyl group and each of the other symbols has the same meaning as defined before: HSiMeIpo$_2$; HSiIpo$_3$; HSiMeIpo(OMe); HSiMeIpo(OBu); HSiIpo(OPh)$_2$; HSiIpo(OMe)$_2$; HSiIpo$_2$(OCH$_2$CH$_2$OCH$_2$CH$_3$); and HSiIpo(OCH$_2$Ph)$_2$.

The component (B) in the inventive composition is an organopolysiloxane having mercapto groups or mercaptoalkyl groups bonded to the silicon atoms. The organopolysiloxane should have at least two mercapto groups in a molecule since this component is a crosslinking agent to form crosslinks by the addition reaction between the mercapto groups and the isopropenyloxy groups in the component (A). Particular examples of such a mercapto-containing organopolysiloxane include: cyclic oligomers of methoxy mercaptomethyl siloxane units, methyl mercaptomethyl siloxane units, methoxy 2-mercaptoethyl siloxane units, methoxy 3-mercaptopropyl siloxane units, methyl 2-mercaptoethyl siloxane units, methyl 3-mercaptopropyl siloxane units and trimethylsiloxy 3-mercaptopropyl siloxane units, and linear organopolysiloxanes expressed by the structural formulas (HSC$_3$H$_6$)Me(OMe)Si—O—(—SiMe$_2$—O—)-
　$_m$—(—SiPh$_2$—O—)$_n$—[—SiMe(C$_3$H$_6$SH-
　)—O—]$_p$—SiMe(OMe)(C$_3$H$_6$SH)

and

Me$_3$Si—O—(—SiMe$_2$—O—)$_m$—(—SiPh$_2$—O—)-
　$_n$—[—SiMe(C$_3$H$_6$SH)—O—]$_q$—SiMe$_3$, in which m, n and p are each zero or a positive integer and q is a positive integer larger than 1. These mercapto-containing organopolysiloxanes can be used either singly or as a combination of two kinds or more according to need. The amount of the mercapto-containing organopolysiloxane in the inventive composition should be in such a range that from 0.1 to 20 moles, or preferably, from 0.5 to 5 moles of the mercapto groups are provided per mole of the isopropenyloxy groups in the component (A). When the amount of the mercapto-containing organopolysiloxane is too small, no sufficient crosslinking density can be obtained resulting in incomplete curing of the composition. When the amount thereof is too large, on the other hand, curing of the composition produces a too large number of crosslinks so that the cured product of the composition may have an unduly increased hardness.

The component (C) is a photosensitizer effective to promote the addition reaction between the isopropenyloxy groups in the component (A) and the mercapto groups in the component (B). Any of the photosensitizer compounds conventionally used in photosensitive compositions can be used without particular limitations. Examples of the compounds useful as the component (C) include: acetophenone, propiophenone, benzophenone, xanthone, fluorene, benzaldehyde, anthraquinone, triphenyl amine, carbazole, 3-methyl acetophenone, 4-methyl acetophenone, 3-pentyl acetophenone, 4-methoxy acetophenone, 3-bromoacetophenone, 4-allyl acetophenone, 1,4,-diacetyl benzene, 3-methoxy benzophenone, 4-methyl benzophenone, 4-chlorobenzophenone, 4,4'-dimethoxy benzophenone, 4-chloro-4'-benzyl benzophenone, 3-chloroxanthone, 3,9-dichloroxanthone, 3-chloro-8-nonyl xanthone, benzoin, benzoin methyl ether, benzoin butyl ether, bis(4-dimethylaminophenyl) ketone, benzyl methoxy ketal, 2-chlorothioxanthone and the like. The role expected in this component is only to slightly photosensitive the other ingredients in the inventive composition so that the amount thereof can be relatively small in the inventive composition. Usually, the amount of the component (C) in the inventive composition should be in the range from 0.01 to 10% by weight or, preferably, from 0.05 to 2% by weight based on the amount of the organopolysiloxane as the component (A) in the composition.

The component (D) is a curing catalyst for the composition and can be omitted when complete curing of the composition is expected by ultraviolet irradiation only without relying on the mechanism of crosslink formation under the influence of the atmospheric moisture. In other words, this component is essential only when the inventive composition should be completely cured in two ways, one, the ultraviolet-induced photochemical crosslink formation and, the other, the condensation reaction under the influence of the atmospheric moisture.

Various kinds of compounds are known in the prior art to be useful as the curing catalyst and can be used without particular limitations. Examples of the compounds suitable as the component (D) include: metal salts of carboxylic acids, e.g. lead 2-ethylhexoate, dibutyl tin diacetate, dibutyl tin dilaurate, butyl tin tri-2-ethylhexoate, iron 2-ethylhexoate, cobalt 2-ethylhexoate, manganese 2-ethylhexoate, zinc 2-ethylhexoate, tin (II) caprylate, tin naphthenate, tin oleate, tin butyrate, titanium naphthenate, zinc naphthenate, cobalt naphthenate and zinc stearate; organic titanate esters, e.g. tetrabutyl titanate, tetra(2-ethylhexy)titanate, triethanolamine titanate and tetra(isopropenyloxy)titanate; organic titanium compounds, e.g. organosiloxy titaniums and β-carbonyl titanium; aluminum alkoxides; aminoalkyl-substituted alkoxysilane compounds, e.g. 3-aminopropyl triethoxy silane and N-(trimethoxysilylpropyl)ethylenediamine; amine compounds and salts thereof, e.g. hexyl amine and dodecylamine phosphate; quaternary ammonium salts, e.g. benzyl triethyl ammonium acetate; alkali metal salts of lower carboxylic acids, e.g. potassium acetate, sodium acetate and lithium oxalate; dialkyl hydroxylamines, e.g. dimethyl hydroxylamine and diethyl hydroxylamine; guanidine compounds and guanidino-containing organosilane and organopolysiloxanes, e.g. guanidine, tetramethyl guanidine, 3-tetramethylguanidinopropyl trimethoxy silane and 1,1,1,3,5,7,7,7,-octamethyl-3,5-di(3-tetramethylguanidinopropy)tetrasiloxane and so on. These compounds can be used either singly or as a combination of two kinds or more according to need. In particular, the last mentioned guanidine compounds and guanidino-containing organosilicon compounds are preferable in respect of, in addition to the efficiency in promoting the reaction of crosslink formation, the activity thereof in improving the adhesiveness of the composition to the substrate surface.

The amount of the curing catalyst as the component (D) should be, when it is used, in the range from 0.01 to 10 parts by weight or, preferably, from 1.0 to 5 parts by weight per 100 parts by weight of the component (A). When the amount thereof is smaller than 0.01 part by weight, no improvement can be obtained in the curability of the composition under the influence of the atmospheric moisture so that an unduly long time may be taken for complete curing of the composition or no curing can ever be achieved in the core portion of a thick body. When the amount of the curing catalyst is too large, on the other hand, the crosslinking reaction proceeds too rapidly so that the time taken for surface filming is greatly decreased to cause inconvenience in respect of workability of the composition and the composition after curing may be poor in the heat resistance and weatherability.

It is optional that the inventive composition is admixed with a filler with an object to improve the mechanical properties of the composition after curing although the amount thereof is limited not to unduly decrease the transparency of the composition to ultraviolet light. Usable fillers include fumed silica, calcined silica, precipitated silica, fumed titanium dioxide, calcium carbonate, diatomaceous earth and calcium silicate. These fillers may be surface-treated in advance with an organosilicon compound such as organochlorosilanes, organopolysiloxanes, hexamethyl disilazane and the like when hydrophobic nature of the surface is desired.

As is understood from the above given description, the inventive organopolysiloxane composition prepared by compounding the components (A), (B), (C) and, optionally, (D) is curable in two ways, firstly, by the irradiation with ultraviolet light and, secondly, under the influence of the atmospheric moisture so that the composition is useful not only in the applications as an adhesive, sealing material and FIPG (formed-in-place gasket) material but also in the applications in which at least the surface layer should be rapidly cured although no rapid curing is required in the core portion of a thick body such as a surface-releasable coating agent, electrically insulating coating material, encapsulating material for electronic circuit boards and electronic devices, coating material of planographic printing plates, fabric coating material and so on. In particular, the adequately long time for surface filming of the composition gives an advantage that the composition can be used conveniently in a process involving a step of repeated dipping with a long intervals under contacting with air or as the vehicle of a printing ink for screen printing.

The inventive composition comprising all of the essential components is not always fully storable over a long period of, for example, several months or longer so that it is sometimes advantageous that the composition is supplied in two packages each containing one of the components (A) and (B). When a ready-mixed composition containing all of the essential components is stored prolongedly, the composition would possibly cause a viscosity increase or eventual gelation by the reaction of the isopropenyloxy groups in the component (A) with a trace amount of the moisture content in the composition. This problem can be solved at least partly by admixing the composition with an organosilicon compound having one or more of hydrolyzable groups in a molecule, such as methyl trimethoxy silane, as a preservative.

When the inventive composition should be used as a coating material or as a primer, it is convenient that the composition is dissolved in an organic solvent to give a solution having an appropriate viscosity. It is of course optional that the inventive composition is admixed with various kinds of known additives such as coloring agents, heat and cold resistance improvers, thixotropy modifiers, dehydrating agents, flame retardants, oiliness improvers, adhesion aids and so on each in a limited amount not to unduly disturb the two-way curability of the composition.

In the following, the room temperature-curable organopolysiloxane composition of the invention is described in more detail by way of examples, in which the term of "parts" always refers to "parts by weight" and the values of viscosity are all those obtained by the measurement at 25° C.

PREPARATION 1

Into a four-necked glass-made flask of 3-liter capacity equipped with a stirrer, thermometer and reflux condenser with a stopcocked drain to discharge the condensate were introduced 1000 g of an α,ω-bis(divinylmethylsilyl)dimethylpolysiloxane and 1000 g of toluene and the mixture in the flask was heated under reflux until complete dehydration followed by cooling to room temperature. Thereafter, 0.4 g of an isopropyl alcohol solution of chloroplatinic acid in a concentration of 2% by weight as platinum and 23.7 g of methyl diisopropenyloxy silane were added to the mixture which was heated at 70° to 80° C. for 3 hours to effect the reaction followed by stripping of toluene under reduced pressure to give 990 g of a clear liquid product having a viscosity of 820 centistokes, specific gravity of 0.974 and refractive index of 1.4057. The results of the infrared absorption spectrophotometric analysis and NMR analysis indicated that this product, which is referred to as the polysiloxane A hereinbelow, was a dimethylpolysiloxane terminated at each molecular chain end with a 2-(diisopropenyloxy methyl silyl)ethyl group expressed by the formula

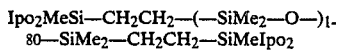

PREPARATION 2

The synthetic procedure for the preparation of an isopropenyloxy-containing organopolysiloxane, which is referred to as the polysiloxane B hereinbelow, was substantially the same as in Preparation 1 described above excepting replacement of the α,ω-bis(divinylmethylslyl)dimethylpolysiloxane with the same amount of a methyl phenyl vinyl polysiloxane having a viscosity of 720 centistokes and containing 0.27 mole per 100 g of vinyl groups bonded to the silicon atoms at the chain terminals as well as at intermediate positions along the polysiloxane chain and 2.0% by moles of phenyl groups based on the overall number of the organic groups bonded to the silicon atoms and further replacement of 23.7 g of the methyl diisopropenyloxy silane with 42.7 g of methyl methoxy isopropenyloxy silane. The result was that 985 g of a clear liquid product having a viscosity of 960 centistokes were obtained which could be identified to be an organopolysiloxane expressed by the structural formula:

PREPARATION 3

A similar synthetic procedure to Preparation 1 was undertaken to react 1000 g of a dimethylpolysiloxane having a viscosity of 810 centistokes and containing 0.013 mole per 100 g of vinyl groups, each vinyl group being bonded only to one of the molecular chain ends of the organopolysiloxane, and 25.0 g of ethoxy diisopropenyloxy silane. The result was that 990 g of a clear liquid product, which is referred to as the polysiloxane C hereinbelow, were obtained, which could be identified to be an organopolysiloxane expressed by the structural formula below, in which the symbol Et denotes an ethyl group:

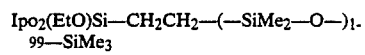

EXAMPLE 1 AND COMPARATIVE EXAMPLE 1

A curable organopolysiloxane composition, which is referred to as the silicone composition I hereinbelow, was prepared in Example 1 by uniformly blending, in a dry atmosphere, 100 parts of the polysiloxane A prepared in Preparation 1 described above, 10 parts of a mercapto-containing and methoxy-terminated organopolysiloxane having a viscosity of 35 centistokes and expressed by the formula

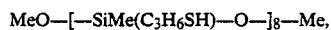

which is referred to as the mercaptosiloxane I hereinbelow, 1.0 part of methyl trimethoxy silane, 0.5 part of 3-(tetramethylguanidino)propyl trimethoxy silane, 0.5 part of benzophenone and 10 parts of a fumed silica filler having a specific surface area of 200 m²/g and treated with an organosilane compound to be imparted with surface hydrophobicity. The tack-free time of this silicone composition I was 12 hours as determined by the procedure specified n JIS A 5758.

For comparison, another organopolysiloxane composition, which is referred to as the silicone composition II hereinbelow, was prepared in Comparative Example 1 by uniformly blending, in a dry atmosphere, 100 parts of a diorganopolysiloxane having a viscosity of 30,800 centistokes and composed of 95% by moles of Me₂SiO units and 5% by moles of Ph₂SiO units with a silanolic hydroxy group at each molecular chain end, 13 parts of the same fumed silica filler having hydrophobic surface as used in the silicone composition I, 3.0 parts of methyl tri(isopropenyloxy)silane, 0.5 part of 3-(tetramethylguanidino)propyl trimethoxy silane, 5.0 parts of the same mercapto-containing, methoxy-terminated organopolysiloxane as used in the silicone composition I and 0.5 part of benzophenone. The tack-free time of this silicone composition II was 3 minutes.

Each of the silicone compositions I and II was shaped into sheets of 120 mm by 120 mm by 2 mm dimensions. One of the thus shaped sheets was irradiated with ultraviolet light for 6 seconds at a distance of 10 cm from two high-pressure mercury lamps of 80 W/cm output to be cured into a cured silicone rubber sheet. The other of the shaped sheets was kept standing for 7 days in an atmosphere of 55% relative humidity at 23° C. to be cured by the influence of the atmospheric moisture into a cured silicone rubber sheet. These ultraviolet-cured

and moisture-cured silicone rubber sheets of the silicone compositions I and II were subjected to the measurement of the mechanical properties to give the results shown in Table 1 below.

TABLE 1

| | Silicone composition | Hardness, JIS-A | Ultimate elongation, % | Tensile strength, kg/cm² |
|---|---|---|---|---|
| I | Ultraviolet-cured | 21 | 110 | 13 |
| | Moisture-cured | 16 | 180 | 11 |
| II | Ultraviolet-cured | 20 | 170 | 14 |
| | Moisture-cured | 18 | 280 | 13 |
| III | Ultraviolet-cured | 16 | 80 | 2.0 |
| | Moisture-cured | 14 | 120 | 1.5 |
| IV | Ultraviolet-cured | 14 | 70 | 1.8 |
| | Moisture-cured | 12 | 100 | 1.5 |
| V | Ultraviolet-cured | 10 | 130 | 1.8 |
| | Moisture-cured | 8 | 160 | 1.0 |
| VII | Ultraviolet-cured | 27 | 120 | 13 |
| | Moisture-cured | 21 | 230 | 10 |

EXAMPLES 2 TO 6

Curable organopolysiloxane compositions, referred to as the silicone compositions III, IV, V, VI and VII hereinbelow, were prepared in Examples 2 to 6, respectively, each by uniformly blending, in a dry atmosphere, 100 parts of the polysiloxane A, B or C with the mercaptosiloxane I used in Example 1 or another mercapto-containing methoxy-terminated organopolysiloxane having a viscosity of 50 centistokes, referred to as the mercaptosiloxane II hereinbelow, expressed by the formula MeO—(—SiMe₂—O—)₃₀—[—SiMe(C₃H₆SH—)—O—]₅—Me, benzophenone, which is referred to as the photosensitizer I hereinbelow, di(ethoxy)methyl phenyl ketone of the formula Ph—CO—CH(OC₂H₅)₂, which is referred to as the photosensitizer II hereinbelow, or 2-hydroxycyclohexyl phenyl ketone, which is referred to as the photosensitizer III hereinbelow, and 3-(tetramethylguanidino)propyl trimethoxy silane, which is referred to as the guanidinosilane hereinbelow, or dibutyl tin dilaurate as the curing catalyst as well as with or without methyl trimethoxy silane and the same surface-treated fumed silica filler as used in the preceding examples. The amounts of these compounded ingredients are shown in parts in Table 2 below. The tack-free time of the silicone compositions III, IV and V was 12 hours and the tack-free time of the silicone compositions VI and VII was 24 hours.

TABLE 2

| Silicone composition No. | | III | IV | V | VI | VII |
|---|---|---|---|---|---|---|
| Polysiloxane | | A | A | B | C | A |
| Mercaptosiloxane | I | 10 | 10 | — | — | 10 |
| | II | — | — | 10 | 20 | — |
| Photosensitizer | I | — | — | 0.5 | — | — |
| | II | 1.0 | 1.0 | — | — | — |
| | III | — | — | — | 0.5 | 0.1 |
| Methyl trimethoxy silane | | 1.0 | 1.0 | 1.0 | — | 1.0 |
| Guanidinosilane | | 0.5 | 0.5 | 0.5 | 0.5 | — |
| Dibutyltin dilaurate | | — | — | — | — | 0.1 |
| Silica filler | | — | — | — | — | 10 |

Each of these silicone compositions was cured into cured silicone rubber sheets either by the ultraviolet irradiation or by standing in a moisture-containing atmospheric air in the same manner as in the preceding examples and the mechanical properties thereof were measured to give the results shown in Table 1. No cured silicone rubber sheets could be obtained from the silicone composition VI which was converted merely to a gelled material by the ultraviolet irradiation or in the moisture-containing air.

EXAMPLE 7

A transparent curable organopolysiloxane composition was prepared by uniformly blending, in a dry atmosphere, 100 parts of the polysiloxane A prepared in Preparation 1 with 23 parts of a mercapto-containing organopolysiloxane having a viscosity of 200 centistokes and a mercapto equivalent of 1500 and expressed by the formula Me₃—Si—O—(—SiMe₂—O—)₉.
₅—[—SiMe(C₃H₆SH)—O—]₅—SiMe₃, and 1 part of 2-hydroxycyclohexyl phenyl ketone as the photosensitizer. This composition was shaped into a sheet of 2 mm thickness which was irradiated with ultraviolet light from an ultraviolet lamp (FL20SBL, a product by Mitsubishi Electric Co.) at a distance of 10 cm for 30 minutes to give a dose of 2 mW/cm². The thus obtained cured silicone rubber sheet was free of surface tackiness and had a hardness, JIS-A, of 5 and ultimate elongation of 60%.

What is claimed is:

1. A curable organopolysiloxane composition which comprises:
   (A) 100 parts by weight of an organopolysiloxane having, in a molecule, at least one isopropenyloxy silyl-substituted ethyl or propyl group represented by the general formula —(—CH₂—)$_a$—Si(—O—CMe═CH₂)$_b$(—OR)$_c$.
   (Me)$_d$, in which Me denotes a methyl group, R denotes a monovalent saturated hydrocarbon group, a is 2 or 3, b is 1, 2 or 3 and c and d are each zero, 1 or 2 with the proviso that b+c+d is equal to 3;
   (B) a mercapto-containing organopolysiloxane having, in a molecule, at least two mercapto groups in such an amount as to provide from 0.1 to 20 moles of the mercapto groups per mole of the isopropenyloxy groups in the component (A); and
   (C) from 0.01 to 10 parts by weight of a photosensitizer.

2. The curable organopolysiloxane composition as claimed in claim 1 which further comprises a curing catalyst in an amount not exceeding 10 parts by weight per 100 parts by weight of the component (A).

3. The curable organopolysiloxane composition as claimed in claim 1 wherein the photosensitizer as the component (C) is a compound selected from the class consisting of benzophenone, di(ethoxy)methyl phenyl ketone and 2-hydroxycyclohexyl phenyl ketone.

4. The curable organopolysiloxane composition as claimed in claim 1 wherein the photosensitizer is acetophenone, propiophenone, xanthone, fluorene, benzaldehyde, anthraquinone, triphenyl amine, carbazole, 3-methyl acetophenone, 4-methyl acetophenone, 3-pentyl acetophenone, 4-methoxy acetophenone, 3-bromoacetophenone, 4-allyl acetophenone, 1,4-diacetyl benzene, 3-methoxy benzophenone, 4-methyl benzophenone, 4-chlorobenzophenone, 4,4'-dimethoxy benzophenone, 4-chloro-4'-benzyl benzophenone, 3-chloroxanthone, 3,9-dichloroxanthone, 3-chloro-8- nonyl xanthone, benzoin, benzoin methyl ether, benzoin butyl ether, bis(4-dimethylaminophenyl)ketone, benzyl methoxy keta or 2-chlorothioxanthone.

5. The curable organopolysiloxane composition as claimed in claim 2 wherein the curing catalyst is lead 2-ethylhexoate, dibutyl tin diacetate, dibutyl tin dilaurate, butyl tin tri-2-ethylhexoate, iron 2-ethylhexoate, cobalt 2-ethylhexoate, manganese 2-ethylhexoate, zinc 2-ethylhexoate, tin (II) caprylate, tin naphthenate, tin oleate, tin butyrate, titanium naphthenate, zinc naphthenate, cobalt naphthenate and zinc stearate, tetrabutyl titanate, tetra(2-ethylhexyl)titanate, triethanolamine titanate, tetra(isopropenyloxy)titanate, 3-aminopropyl triethoxy silane, N-(trimethoxysilylpropyl)ethylenediamine, hexyl amine dodecylamine phosphate, benzyl triethyl ammonium acetate, potassium acetate, sodium acetate, lithium oxalate, dimethyl hydroxylamine, diethyl hydroxylamine, guanidine, tetramethyl guanidine, 3-tetramethylguanidinopropyl trimethoxy silane or 1,1,1,3,5,7,7,7,-octamethyl-3,5-di(3-tetramethylguanidinopropyl)tetrasiloxane.

* * * * *